(12) United States Patent
Carson

(10) Patent No.: US 12,703,505 B2
(45) Date of Patent: Aug. 11, 2026

(54) CONTROL SYSTEM CONFIGURED TO CONTROL EJECTION OF AN EJECTION SEAT

(71) Applicant: Rockwell Collins, Inc., Cedar Rapids, IA (US)

(72) Inventor: Kassidy L. Carson, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 92 days.

(21) Appl. No.: 18/750,504

(22) Filed: Jun. 21, 2024

(65) Prior Publication Data

US 2025/0388334 A1 Dec. 25, 2025

(51) Int. Cl.
*B64D 45/00* (2006.01)
*B64D 25/10* (2006.01)
*B64D 43/02* (2006.01)

(52) U.S. Cl.
CPC ............. *B64D 45/00* (2013.01); *B64D 25/10* (2013.01); *B64D 43/02* (2013.01)

(58) Field of Classification Search
CPC ...................................................... B64D 45/00
See application file for complete search history.

(56) References Cited

U.S. PATENT DOCUMENTS 4,527,758 A * 7/1985 Ayoub .................. B64D 17/58 244/150
11,390,390 B2 * 7/2022 Haas ..................... B64D 25/10
11,505,332 B1 11/2022 Ren et al.
11,518,527 B2 * 12/2022 McCumber .............. B60N 2/75
11,560,232 B2 * 1/2023 Holstine ................ B64D 25/10
11,565,791 B2 * 1/2023 Fulcher .................. B64D 25/10
11,655,041 B2 * 5/2023 Stribrny ................. B64D 25/10 244/122 AG
11,834,185 B2 * 12/2023 Carson ................... B64D 17/56
11,891,183 B2 * 2/2024 McCumber .......... B60N 2/0248
12,304,644 B2 * 5/2025 Carson ................... B64D 17/62
12,325,525 B2 * 6/2025 Carson ................... B64D 25/10
12,454,361 B1 * 10/2025 Salois .................... B64D 25/10

(Continued)

FOREIGN PATENT DOCUMENTS

CN 108583909 A 9/2018
CN 113919208 A 1/2022

(Continued)

*Primary Examiner* — Michael A Berns
(74) *Attorney, Agent, or Firm* — CANTOR COLBURN LLP

(57) ABSTRACT

A control system to control ejection of an ejection seat includes a sensor configured to measure ejection environment parameters at time of ejection from an aircraft and a controller in signal communication with the sensor. The controller receives the ejection environment parameters and stores an ejection sequence operable according to a plurality of different ejection sequence modes. The controller determines a weight of an occupant seated in the ejection seat and a target ejection sequence mode among the plurality of different ejection sequence modes based on the ejection environment parameters and the weight of the occupant. The controller executes the ejection sequence according to the target ejection sequence mode to eject the ejection seat and safely recover the occupant.

15 Claims, 10 Drawing Sheets

(56) References Cited

U.S. PATENT DOCUMENTS

| | | | | |
|---|---|---|---|---|
| 2024/0317409 | A1 * | 9/2024 | Carson | B64D 25/10 |
| 2026/0021894 | A1 * | 1/2026 | Mohling | B64D 25/10 |

FOREIGN PATENT DOCUMENTS

| | | | |
|---|---|---|---|
| CN | 116187129 | A | 5/2023 |
| CN | 116663457 | A | 8/2023 |
| CN | 117131625 | A | 11/2023 |

* cited by examiner 100
102
104
106
108
302
304
306
Z
Y
X 220
222
104
106
110

CONTROL SYSTEM CONFIGURED TO CONTROL EJECTION OF AN EJECTION SEAT

BACKGROUND

The present disclosure generally relates to ejection seats, and more particularly, to controlling ejection seat systems.

Aircraft ejection systems utilize an ejection event sequencer to control ejection seat events. The ejection seat utilizes a high energy catapult assembly (sometimes referred to as a rocket-catapult assembly) to expel the ejection seat from an aircraft. The high energy catapult assembly is an energetic device that includes a catapult stage and a rocket stage. The catapult stage fires first, ejecting the ejection seat and any occupant of the ejection seat from the aircraft cockpit. The rocket stage (sometimes referred to as the propulsion phase) then ignites and propels the ejection seat and its occupant to a separation distance from the aircraft and terrain associated with safe parachute recovery.

Conventional ejection event sequences utilize harsh mode boundary transitions and fixed sequential time deployments. Trading of acceleration-based injury performance for terrain clearance can result in smaller/lighter aircrew to be more susceptible to injury by parachute loading, while larger/heavier aircrew have minimal aircraft tail and ground terrain clearance. Optimization is limited when the aircrew mass is unknown and varies widely.

SUMMARY

According to a non-limiting embodiment, a control system to control ejection of an ejection seat includes a sensor configured to measure ejection environment parameters at time of ejection from an aircraft and a controller in signal communication with the sensor. The controller receives the ejection environment parameters and stores an ejection sequence operable according to a plurality of different ejection sequence modes. The controller determines a weight of an occupant seated in the ejection seat and a target ejection sequence mode among the plurality of different ejection sequence modes based on the ejection environment parameters and the weight of the occupant. The controller executes the ejection sequence according to the target ejection sequence mode to eject the ejection seat and safely recover the occupant.

In addition to one or more of the features described above, or as an alternative to any of the foregoing embodiments, the ejection sequence includes a plurality of different ejection events executed according to individual timing sequences, and the ejection environment parameters include measured pressure(s), measured airspeed, and/or measured altitude at time of ejection.

In addition to one or more of the features described above, or as an alternative to any of the foregoing embodiments, the plurality of different ejection sequence modes include a first ejection sequence mode, a second ejection sequence mode, and a third ejection sequence mode.

In addition to one or more of the features described above, or as an alternative to any of the foregoing embodiments, the second ejection sequence mode includes a first plurality of sub-modes, and the second ejection sequence mode includes a second plurality of sub-modes different from the first plurality of sub-modes.

In addition to one or more of the features described above, or as an alternative to any of the foregoing embodiments, wherein: the first mode corresponds to a first airspeed range and a first altitude range, which ranges from a first altitude to a second altitude greater than the first altitude; a first sub-mode of the second mode corresponds to the second airspeed range greater than the first speed range and an altitude range similar to the first altitude range; a second sub-mode of the second mode corresponds to a third airspeed range greater than the second airspeed range and an altitude range similar to the first altitude range; a first sub-mode of the third mode corresponds to an airspeed ranging from the first airspeed range to the second airspeed range and the third altitude range greater than the first and second altitude ranges; and a second sub-mode of the third mode corresponds to the third airspeed range greater than the first and second airspeed range and the third altitude range greater than the first and second altitude ranges.

In addition to one or more of the features described above, or as an alternative to any of the foregoing embodiments, the controller determines a plurality of scalar values and a plurality of variable values, and applies one or both of at least one selected scalar value included in the plurality of scalar values and at least one selected variable value included in the plurality of variable values to the timing sequences based on the target ejection sequence mode.

In addition to one or more of the features described above, or as an alternative to any of the foregoing embodiments, the controller applies at least one selected scalar value included in the plurality of scalar values to the timing sequence corresponding to the first mode, and applies both the at least one selected scalar value and at least one selected variable value included in the plurality of variable values to the first and second sub-modes of the second mode and the first and second sub-modes of the third mode.

In addition to one or more of the features described above, or as an alternative to any of the foregoing embodiments, the plurality of scalar values includes a mass scalar that is determined by the controller based on a change in velocity of the ejection system over a distance or period of time.

In addition to one or more of the features described above, or as an alternative to any of the foregoing embodiments, the plurality of scalar values includes a mass scalar that is determined by the controller based on the size of the occupant.

The foregoing features and elements may be combined in any combination, without exclusivity, unless expressly indicated herein otherwise. These features and elements as well as the operation of the disclosed embodiments will become more apparent in light of the following description and accompanying drawings.

According to another non-limiting embodiment, a control system configured to control ejection of an ejection seat, the control system comprises a sensor and a controller in signal communication with the sensor. The sensor is configured to measure ejection environment parameters upon ejection from an aircraft, the parameters including an equivalent airspeed and equivalent altitude of an ejection system at time of ejection from the aircraft. The controller is configured to receive the ejection environment parameters and to store an ejection sequence operable according to a plurality of different ejection sequence modes, the controller configured to determine a target ejection sequence mode among the plurality of different ejection sequence modes based on the ejection environment parameters and to execute the ejection sequence according to the target ejection sequence mode to eject the ejection seat and safely recover an occupant. The ejection sequence includes a plurality of different ejection events executed according to individual timing sequences, and wherein at least one of the timing sequences includes a variable delay tolerance that is dynamically calculated by the controller based on the equivalent airspeed output from the sensor.

According to yet another non-limiting embodiment, a method of controlling ejection of an ejection seat is provided. The method comprises outputting measured ejection environment parameters from a sensor, where the parameters include an equivalent airspeed and equivalent altitude of an ejection system at time of ejection from an aircraft. The method further includes storing, in a controller, an ejection sequence operable according to a plurality of different ejection sequence modes, the ejection sequence including a plurality of different ejection events executed according to individual timing sequences, and dynamically calculating, by the controller a variable delay tolerance based on the equivalent airspeed output from the sensor. The method further includes applying the variable delay tolerance to a timing sequence corresponding to at least one of the ejection events, and determining, by the controller, a target ejection sequence mode among the plurality of different ejection sequence modes based on the ejection environment parameters. The method further includes executing, by the controller, the ejection sequence according to the target ejection sequence mode to eject the ejection seat and safely recover an occupant.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
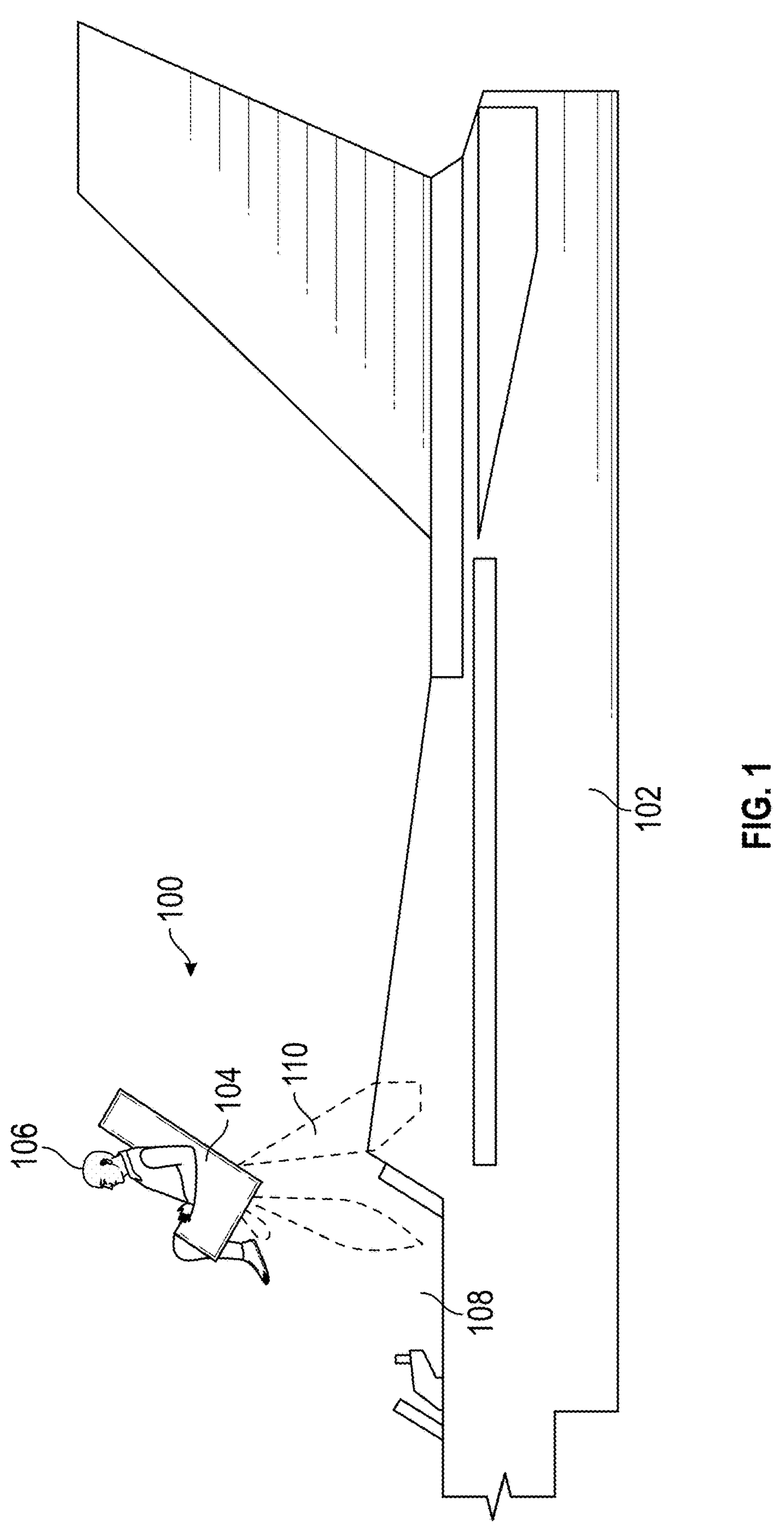
FIG. 1 illustrates an ejection seat being expelled (ejected) from an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Current ejection seat systems have harsh mode boundary transitions from no drogue parachute deployment to fixed time deployments. Currently, at a low airspeed, low altitude type situations (Mode 1), the ejection seat does not deploy the drogue parachute and deploys the main parachute very rapidly. At higher airspeed and low altitude situations (Mode 2) and high altitude situations (Mode 3), deploying the main parachute immediately upon ejection of the ejection seat becomes too perilous, so a drogue parachute is deployed to decelerate the ejection seat to the safe velocity so that the main parachute may be later deployed safely.

Historically, the timing between deployment of the drogue parachute and deployment of the main parachute in Mode 2 has a fixed timing and deployment of the drogue parachute and deployment of the main parachute in Mode 3 is based on altitude with some modulation based on airspeed. Further, in a two-place cockpit or a multi-place cockpit, where there are multiple ejections taking place in short sequence, a form of instability is induced. Currently, a divergence rocket coupled to each seat may be fired that rolls and/or yaws each ejection seat to change its trajectory by way of rotating the orientation of the main propulsion system thrust. However, while the divergence rocket control is useful at lower speeds, there is a certain speed threshold where divergence rocket control is not particularly useful as it may increase injury risk unnecessarily; whereas, divergence separation may be achieved by a combination of inter-seat ejection delay and higher relative downrange travel attributed to the higher velocities during the elapsed delay.

Disclosed herein is an integrated system that reduces the harsh nature of the mode boundaries between the low airspeed, low altitude type situations (Mode 1) and the high airspeed, high altitude type situations (Mode 2 and 3). Rather than three discrete modes, various embodiments described herein divides Modes 2 into sub-modes: Mode 2A corresponding to an event active/inhibit mode invoked at low/intermediate altitudes and low or intermediate (low/intermediate) airspeeds; and a Mode 2B corresponding to an event inhibit/invert mode invoked at low/intermediate altitudes and intermediate/high airspeeds. Likewise, Mode 3 is also divided into sub-modes: Mode 3A corresponding to an event active/inhibit mode invoked at high altitudes and low/intermediate airspeeds; and a Mode 3B corresponding to an event inhibit/invert mode invoked at high altitudes and intermediate/high airspeeds. Accordingly, the system: (a) lowers the airspeed/altitude threshold for conventional 'low/slow' mode 1 of operation where drogue parachute is inhibited (no/minimal main parachute delay); (b) introduces equivalent airspeed and altitude based variable drogue deployment timing to conventional 'low/fast' mode 2 of operation (variable main parachute delay); (c) introduces an equivalent airspeed based event "inversion"/"inhibit" boundary not tied (i.e., is independent) to the 'low/fast' mode 2 or "high" mode 3 boundaries, which "slides" according to a variable delay tolerance (i.e., a dynamic variable value); (d) modifies Modes 2 and 3 allowing the drogue parachute to be released just prior to or proximal to aircrew harness release (seat-aircrew separation) for optimization; and (d) allows for inhibiting, inverting, or scaling together various ejection sequence events using velocity and/or pressure changes. Where equivalent airspeed and/or equivalent altitude are mentioned, calculations may be made in the pressure domain using measured total (pitot) and/or base (static) pressures, with the sequencer never "knowing" or calculating speed or altitude. Event "inhibited" (i.e., inhibit) is defined as making inoperative (e.g.; preventing, omitting, not firing) one (or more) event signal that is otherwise "active" (e.g.; is operative, occurs, is fired) in other regions of the mode envelope to prevent it from occurring in the event sequence. Event "inverted" (i.e., invert, inversion) is defined as re-ordering one (or more) event relative to one (or more) other event in the event time sequence (e.g.; firing before or after) compared to event sequencing in other regions of the mode envelope.

In the described ejection system, the airspeed and altitude boundary for low airspeed, low altitude type situations (Mode 1) is lowered to an even safer range so that there are even fewer ejections that would result in a "high speed" Mode 1 situation. In addition, a scaling is implemented that provides for a delay in the recovery parachute deployment. The Modes 2A and 2B allow for: (a) drogue deployment delay reduced or eliminated at aircraft separation; (b) recovery parachute deployment delay that is interpolated using (i) the minimum delay calculated from multiple first, second, or (ii) third order polynomial based on equivalent airspeed and altitude (combinations of total and/or base pressure); (c) short default minimum recovery parachute delay; (d) long default maximum recovery parachute delay; (d) an increase or decrease in drogue severance delay after recovery parachute deployment; and (e) event active/inhibit/invert decisions. The Modes 3A and 3B allow for: (a) long default minimum drogue phase; (b) drogue deployment at aircraft separation; (c) a "fall through" event where recovery parachute deployment and drogue severance is delayed until predetermined equivalent altitude threshold (base pressure) is reached, and (d) event active/inhibit/invert decisions.

In various embodiments, a second order (quadratic) polynomial with four constants is employed. In various embodiments, a linear equation is employed. In various embodiments, a third order equation is employed. Additionally, a divergence system cutoff is employed so that the given speed (or dynamic pressure), in the midst of Mode 2 and extending into Mode 3, divergence system usage is inhibited in two-place cockpit or multi-place cockpit systems. Divergence system usage is typically, but not always, inhibited for single-place cockpit systems at all airspeeds. In Mode 3, main parachute deployment is delayed until the base pressure reading indicates that the ejection seat has fallen through a certain altitude where sufficient breathable oxygen is available in the atmosphere. It is noted that the Mode 3 boundary may be modulated somewhat based on airspeed due to wake effects on the base pressure readings.

Referring now to FIG. 1, an aircraft ejection system 100 is illustrated, in accordance with various embodiments. Aircraft ejection system 100 includes an aircraft 102 and an ejection seat 104. Ejection seat 104 may be installed in aircraft 102 and be configured to expel (i.e.; eject) an occupant 106 (e.g., aircrew) from a cockpit 108. Ejection seat 104 may be propelled from aircraft 102, and more specifically, from cockpit 108 by a propellant 110. Propellant 110 may be configured to propel the combined mass of ejection seat 104 and occupant 106, and may consist of one or multiple cartridge and/or propellant actuated devices (e.g.; mortars, catapults, rockets). Ejection seat 104 is configured to restrain and secure occupant 106 while in aircraft 102 and during the initial stages of an ejection event.

Figure 2A:
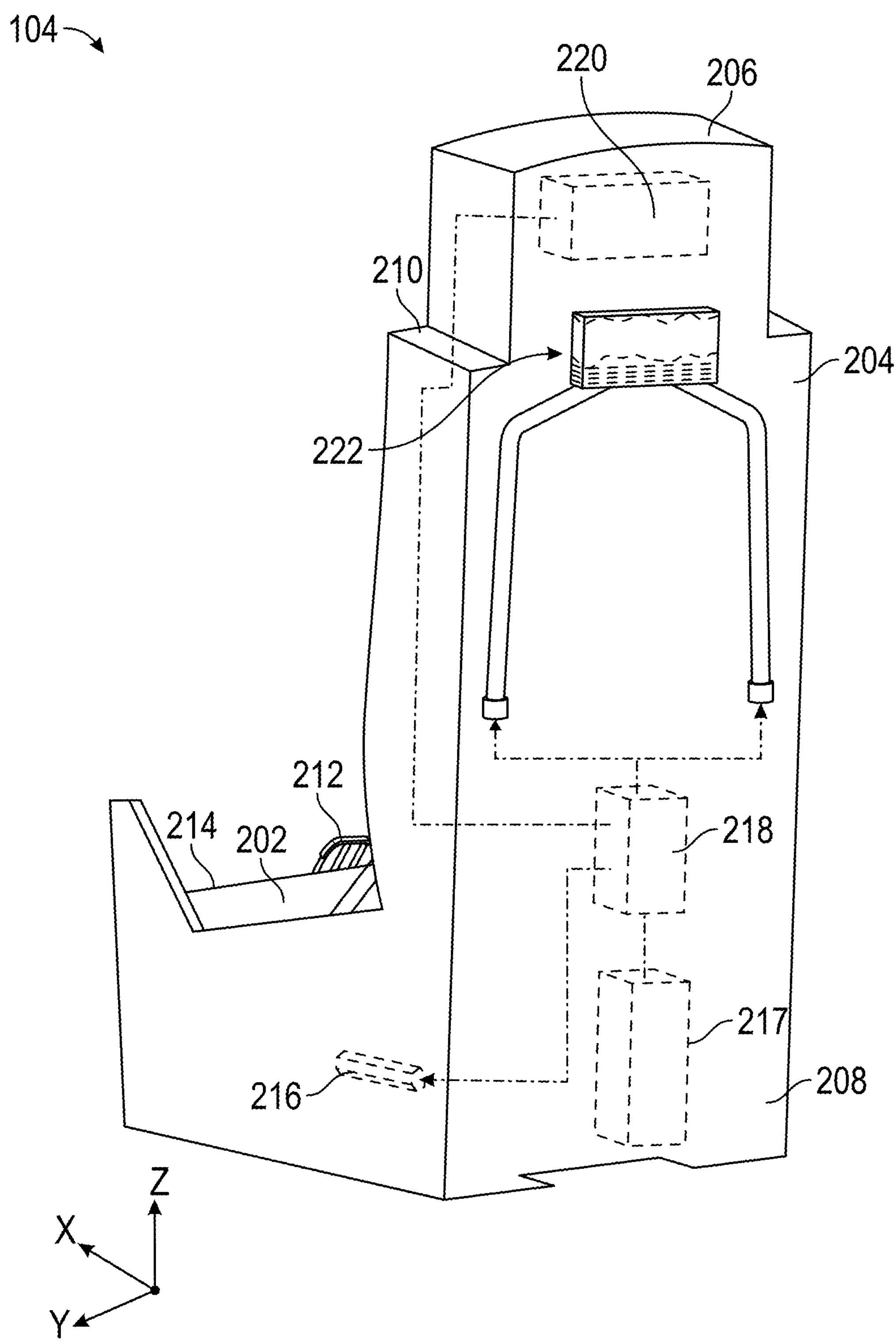
FIGS. 2A and 2B illustrate an ejection system, in accordance with various embodiments.

Referring now to FIG. 2A, components of ejection seat 104 are illustrated, in accordance with various embodiments. Ejection seat 104 includes a seat pan 202, a seatback 204, a headrest 206, an ejection initiation handle 212, a seat-aircrew separator (i.e.; harness release) system 216, a catapult system 217, a controller 218, a main parachute 220, and, in various embodiments, a drogue parachute 222. Seat pan 202 may be located at a lower end 208 of seatback 204 and headrest 206 may be located at an upper end 210 of seatback 204.

Ejection seat 104 further includes an ejection handle 212 that, in various embodiments, may be located proximate a front side 214 of seat pan 202 (e.g., the positive x-direction). Front side 214 is opposite seatback 204. In various embodiments, ejection handle 212 may be located at a right side of seat pan 202 (e.g., the negative y-direction) and/or the left side of seat pan 202 (e.g., the positive y-direction). In various embodiments, ejection handle 212 may be centered between the right side and left side and configured to be between the legs of occupant 106. In various embodiments, ejection handle 212 may include more than one ejection handle. It should be understood that ejection handle 212 may be located in any position that is accessible to occupant 106 of ejection seat 104. Ejection handle 212 may be configured to initiate an ejection sequence upon actuation. For example, occupant 106 pulling/pushing ejection handle/lever/button 212 may cause ejection seat 104 to be expelled from aircraft 102.

Harness release system 216 secures ejection seat 104 to occupant 106. Harness release system 216 is connected to controller 218 and may receive signals from controller 218 controlling the activation of harness release system 216. Harness release system 216 disengages in one or multiple locations in response to signal(s) from controller 218, allowing ejection seat 104 to be separated from occupant 106 (i.e. seat-aircrew separation) after ejection from aircraft 102.

Catapult system 217 may secure ejection seat 104 to aircraft 102. Catapult system 217 may be connected to the power supply of controller 218 and may provide signals to power supply of controller 218 initiating activation of power supply of controller 218. Catapult system 217 is initiated by the aircraft 102 in response to a signal from ejection seat 104 in response to ejection handle 212 being actuated by occupant 106, allowing ejection seat 104 to be separated from aircraft 102. In various embodiments, catapult system 217 may further include propellent (e.g., propellant 110) for propelling ejection seat 104 away from aircraft 102. In various embodiments, catapult system 217 may further include separate propellant for propelling the ejection seat 104 up the rails of aircraft 102 and additional propellant (e.g., sustainer rocket propellant) for propelling the ejection seat 104 beyond aircraft 102 and away from structures and/or terrain.

Main parachute 220 (i.e.; recovery parachute) may be located near upper end 210 of seatback 204. Main parachute 220 may be deployed after ejection seat 104, including occupant 106, have cleared aircraft 102. Main parachute 220 is connected to controller 218 and may receive signals from controller 218 controlling the deployment of main parachute 220.

Drogue parachute 222 may be located near upper end 210 of seatback 204. In various embodiments, drogue parachute 222 may be located in other regions of seatback 204. Drogue parachute 222 may be deployed prior to deploying a delayed main parachute 220 in order to decelerate ejection seat 104 to a safe speed for deploying main parachute 220. Drogue parachute 222 is connected to controller 218 and may receive signals from controller 218 controlling the deployment and/or separation of drogue parachute 222.

Controller 218 controls the timing sequence of an ejection event in response to ejection handle 212 being actuated. The timing sequences that are managed by controller 218 may be different for each aircraft (e.g., aircraft 102). In various embodiments, the timing sequences are predetermined sequences for each aircraft. In various embodiments, controller 218 may receive input from one or more sensors that measure and output various real-time flight parameters in order to modify the timing sequences to the current conditions of ejection seat 104. The one or more sensors may include a temperature sensor, a pressure sensor, an air speed sensor, an altimeter, an accelerometer, and/or a gyroscope. Sensors may be capable of sensing in multiple axes and/or a discrete axis. Based on inputs from one or more of the sensors, controller 218 will control the deployment and/or release of harness release system 216, main parachute 220, and drogue parachute 222, in addition to other systems.

Figure 2B:
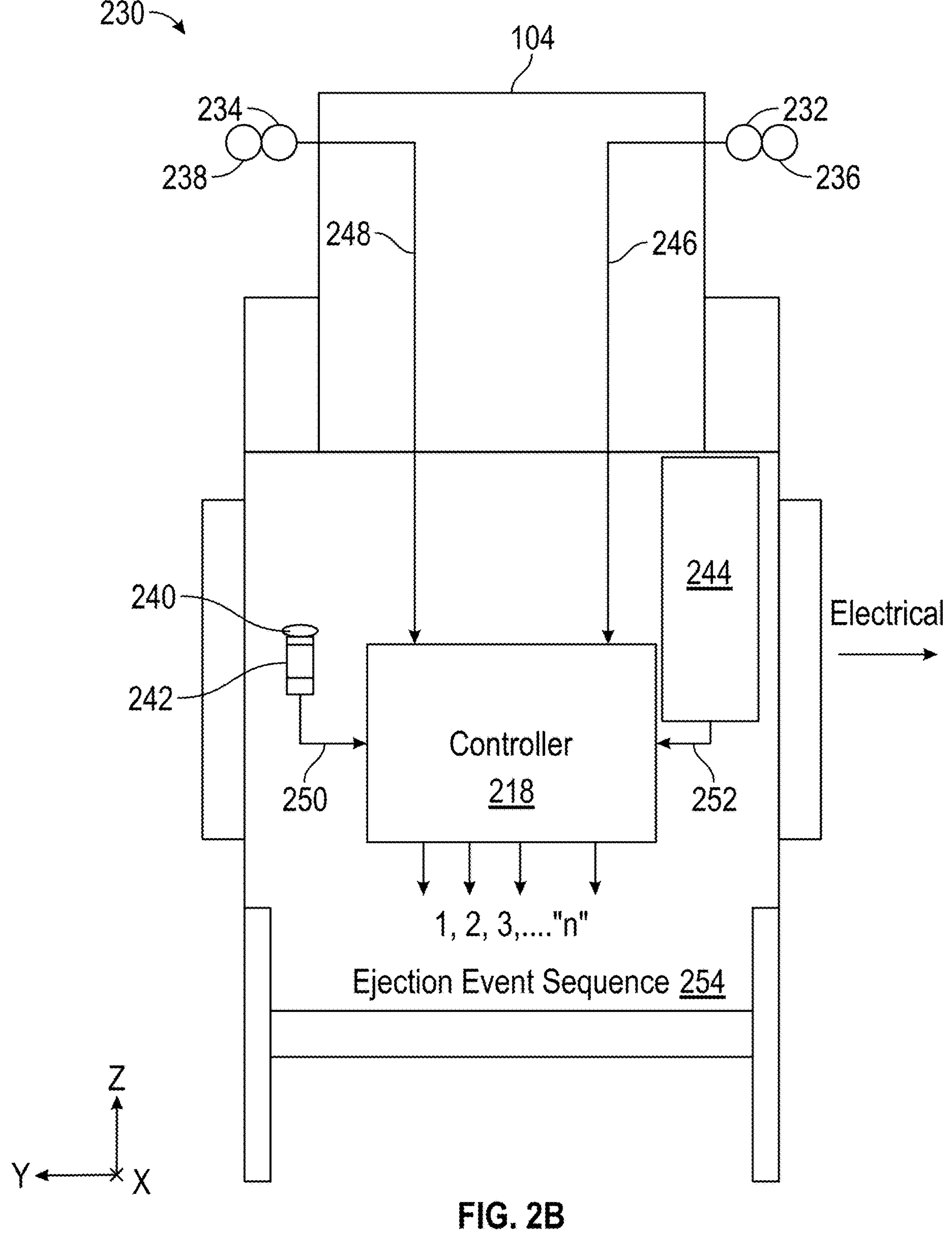

Referring now to FIG. 2B, a diagram 230 of ejection seat 104 is illustrated, in accordance with various embodiments. Diagram 230 includes controller 218 that may be connected to a first pressure sensor 232, a second pressure sensor 234, a first temperature sensor 236, a second temperature sensor 238, a third pressure sensor 240, a third temperature sensor 242, and accelerometer(s) 244. Controller 218 may be connected to first pressure sensor 232 and/or first temperature sensor 236 by a first connection 246 (e.g., wire, cable, tube, etc.). Controller 218 may be connected to second pressure sensor 234 and/or second temperature sensor 238 by a second connection 248. Controller 218 may be connected to third pressure sensor 240 and/or third temperature sensor 242 by a third connection 250. Controller 218 may be connected to accelerometer 244 by a fourth connection 252. In various embodiments, accelerometer 244 may include more than one accelerometer 244 each of which may be in different positions on ejection seat 104. In various embodiments, the sensors (e.g., accelerometer 244, first pressure sensor 232, first temperature sensor 236, etc.) may be integral to controller 218 (e.g.; via circuit board mount, manifold, etc.). It should be understood that the number, location, and signal output (e.g., electrical, pneumatic, etc.) of sensors illustrated and described with respect to FIG. 2B is for illustration and discussion purposes only. Accordingly, there may be more or fewer sensors and/or the sensors may be at different positions with respect to ejection seat 104 and controller 218.

Controller 218 receives inputs from one or more of the sensors and outputs an ejection sequence 254 that may be optimized for the current conditions of ejection seat 104. In various embodiments, controller 218 may be programmed with one or more predefined ejection sequences (e.g., ejection sequence 254), or a sequence of events that are preformed to complete ejection of the ejection seat 104. In various embodiments, controller 218 may calculate a modified ejection sequence based on the predefined ejection sequence and input from one or more of the sensors. The inputs from the one or more sensors may provide additional information with respect to the state of ejection seat 104 or the environment surrounding ejection seat 104. Controller 218 may use this additional information to improve the safety for each occupant 106 of ejection seat 104.

Controller 218 may receive input from one or more of accelerometers 244 during an ejection sequence (e.g., after ejection handle 212 is actuated). In various embodiments, accelerometer 244 may be calibrated before installation to ensure proper data (e.g.; accuracy tolerances). Accelerometer 244 may provide acceleration data in three dimensions (e.g., along the x-axis, the y-axis, and the z-axis). In various embodiments, accelerometer may provide an acceleration and a direction to controller 218. In various embodiments, controller 218 may calculate an acceleration and a direction based on raw data received from accelerometer 244. In various embodiments, controller 218 may receive data from accelerometer 244 at regular time intervals. Each time interval may be about 0.5 ms to about 20 ms, and more specifically, about 1 ms to about 4 ms. In various embodiments, controller 218 may receive data from accelerometer 244 after ejection handle 212 has been actuated.

Controller 218 uses data from accelerometer 244 to determine an approximate size of occupant 106 (e.g.; weight, mass, height and/or the like) and adjusts ejection sequence 254 accordingly. For example, controller 218 may classify occupant 106 as small, medium, or large based on data from accelerometer 244 after ejection handle 212 is actuated. In various embodiments, controller 218 may classify occupant 106 as small or large. In various embodiments, controller 218 may have more than three classifications for the size of occupant 106 (e.g. very light, light, average, heavy, very heavy, and so on). In various embodiments, controller 218 may not assign classification to the size of occupant 106, but rather may indirectly calculate a change in velocity and assign a mass scalar which is useful for modification of the ejection sequence relative to the occupant size. Controller 218 determines a mass scalar based on the size of occupant 106 as inferred from various sensors and uses the determined mass scalar to modify ejection sequence 254. In various embodiments, the mass scalar may be about 0.5 to about 1.5, and more specifically, about 0.7 to about 1.3. In various embodiments, such as in the case of inertia dependent variable thrust profiles, a tighter mass scalar range of about 0.9 to about 1.1 may be used. The occupant size classifications are based on mass of the occupant along with any accompanying safety gear. In various embodiments, a small occupant may have a mass of less than about 150 lbs. (about 68 kilograms), a medium occupant may have a weight between about 150 lbs. (about 68 kilograms) and about 215 lbs. (about 97.5 kilograms), and a large occupant may have a weight of greater than about 215 lbs. (about 97.5 kilograms). In various embodiments, other ranges of mass may be used to identify the different size categories (e.g., small, medium, large). In various embodiments, ranges of change in velocity may be used to identify the different size categories (e.g., high, nominal, low) relative to a nominal, typical, or calibrated value.

Controller 218 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Controller 218 may further comprise memory to store data, executable instructions, system program instructions, and/or controller instructions to implement the control logic of controller 218.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Figure 3:
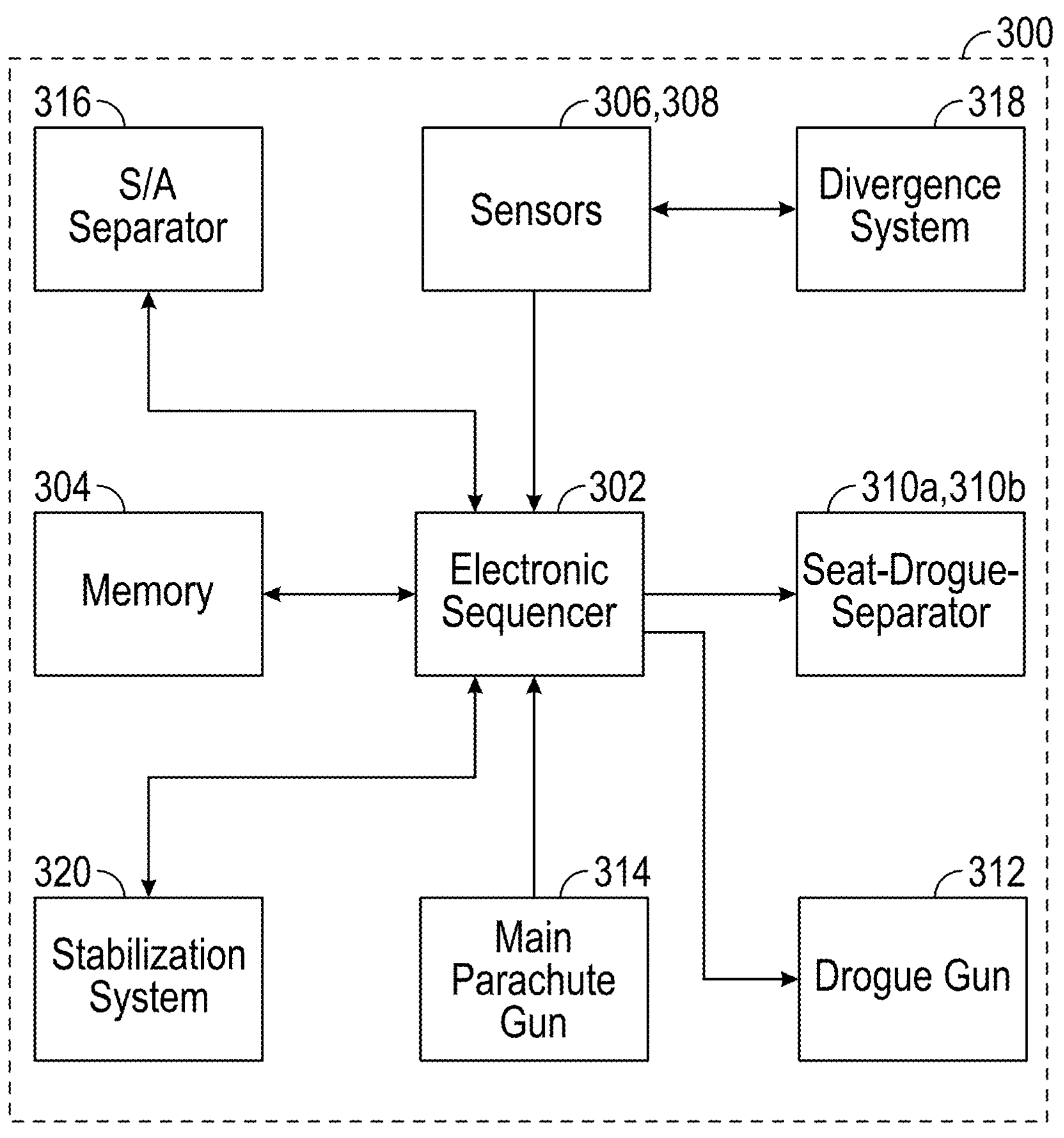
FIG. 3 illustrates a control system for ejection seat events, in accordance with various embodiments.

Turning to FIG. 3, a schematic block diagram of a control system 300 for the ejection system 100 of the aircraft 102 is illustrated, in accordance with various embodiments. Control system 300 includes an electronic sequencer controller 302, which may be implemented as controller 218 of FIG. 2B. The electronic sequencer controller 302 is in electronic communication with sensors 306, 308, which may include sensors such as one or more total (e.g.; Pitot, Kiel, dynamic, etc) pressure sensors and one or more static (e.g.; base, wake, etc) pressure sensors.

In various embodiments, the electronic sequencer controller 302 may be integrated into computer systems of ejection seat 104. In various embodiments, the electronic sequencer controller 302 may be configured as a central network element or hub to access various systems and components of control system 300. In various embodiments, the electronic sequencer controller 302 may be implemented in a single controller, while in other embodiments the electronic sequencer controller 302 may be implemented as and may include one or more controllers and/or one or more tangible, non-transitory memories (e.g., memory 304) and capable of implementing logic. The electronic sequencer controller 302 can include one or more processors, which can include, a digital signal processor (DSP), an application specific integrated circuit (ASIC), a field programmable gate array (FPGA) or other programmable logic device, discrete gate or transistor logic, discrete hardware components, or any combination thereof. The electronic sequencer controller 302 may comprise a processor configured to implement various logical operations in response to execution of instructions, for example, instructions stored on a non-transitory, tangible, computer-readable medium (e.g., memory 304) configured to communicate with electronic sequencer 302. System program instructions and/or controller instructions may be loaded onto a non-transitory, tangible computer-readable medium having instructions stored thereon that, in response to execution by a controller, cause the controller to perform various operations.

In various embodiments, the electronic sequencer controller 302 may be in electronic communication with the sensors 306, 308, which may be disposed on ejection seat 104. For example, sensor 306 may comprise a static pressure sensor (e.g., an altimeter, a barometer, or any other sensor configured for use in determining an altitude and/or a base pressure of an ejection system 100). In various embodiments, sensor 308 is configured to provide sensor data corresponding to a speed of ejection seat 104. For example, sensor 308 may comprise a total pressure sensor (e.g., to provide data to be used with static pressure data of sensor 306 for airspeed and/or dynamic pressure calculation of an ejection system 100), an optical sensor (e.g., a light detection and ranging (LiDAR) sensor, a photonic sensor or the like). Any sensor, or sensors configured for providing data to determine altitude and airspeed or equivalent parameters are within the scope of this disclosure. Based on the variable data measured from the sensors 306, 308 and receiving an ejection command, the sequence controller 302 may initiate a sequence of ejection events, implemented as ejection event sequence 254 of FIG. 2B, as described further herein.

In various embodiments, the control system 300 further comprises a seat-drogue separator 310 (e.g.; severance system, shape charge, or the like), a drogue gun 312 (e.g.; rocket, mortar, or the like), and a main parachute gun 314 (e.g. rocket, mortar, or the like), a seat-aircrew (S/A) separator 316 (e.g. latch, pin puller, or the like), a divergence system 318 (e.g. cartridge, rocket, or the like), and a stabilization system 320 (cartridge, rocket, or the like). In one or more embodiments, the seat-drogue separator can include a primary seat-drogue separator 310*a* and a secondary seat-drogue separator 310*b*.

The drogue gun 312 is configured to deploy the drogue parachute 222 from the ejection seat 104 of FIG. 2A from a stowed state to a deployed state. Similarly, the main parachute gun 314 is configured to deploy the main parachute 220 shown in FIG. 2A from a stowed state to a deployed state. The seat-drogue-separator 310 is configured to release (i.e.; sever) the drogue parachute 222 from the ejection seat 104 during an ejection event. Similarly, the seat-aircrew-separator 316 is configured to release the occupant 106 from the ejection seat 104 during an ejection event; seat-aircrew-separator 316 may be implemented as harness release system 216 of FIG. 2A. Divergence system 318 and stabilization system 320 are configured propel ejection seat 104 and occupant 106 away from aircraft 102, other free bodies, and/or terrain on a predictable trajectory; Divergence system 318 and/or stabilization system 320 may be implemented as part of propulsion system 110 of FIG. 1. In various embodiments, the deployment, separation, divergence, and/or stabilization systems of control system 300 may comprise any fixed or articulating mechanism known in the art, such as a cartridge, rocket, mortar, slug, catapult, pilot chute, guillotine, release latch, pin puller, cable, linkage, piston, shape charge, gimbal, solenoid, or the like. The present disclosure is not limited in this regard.

Figure 4A:
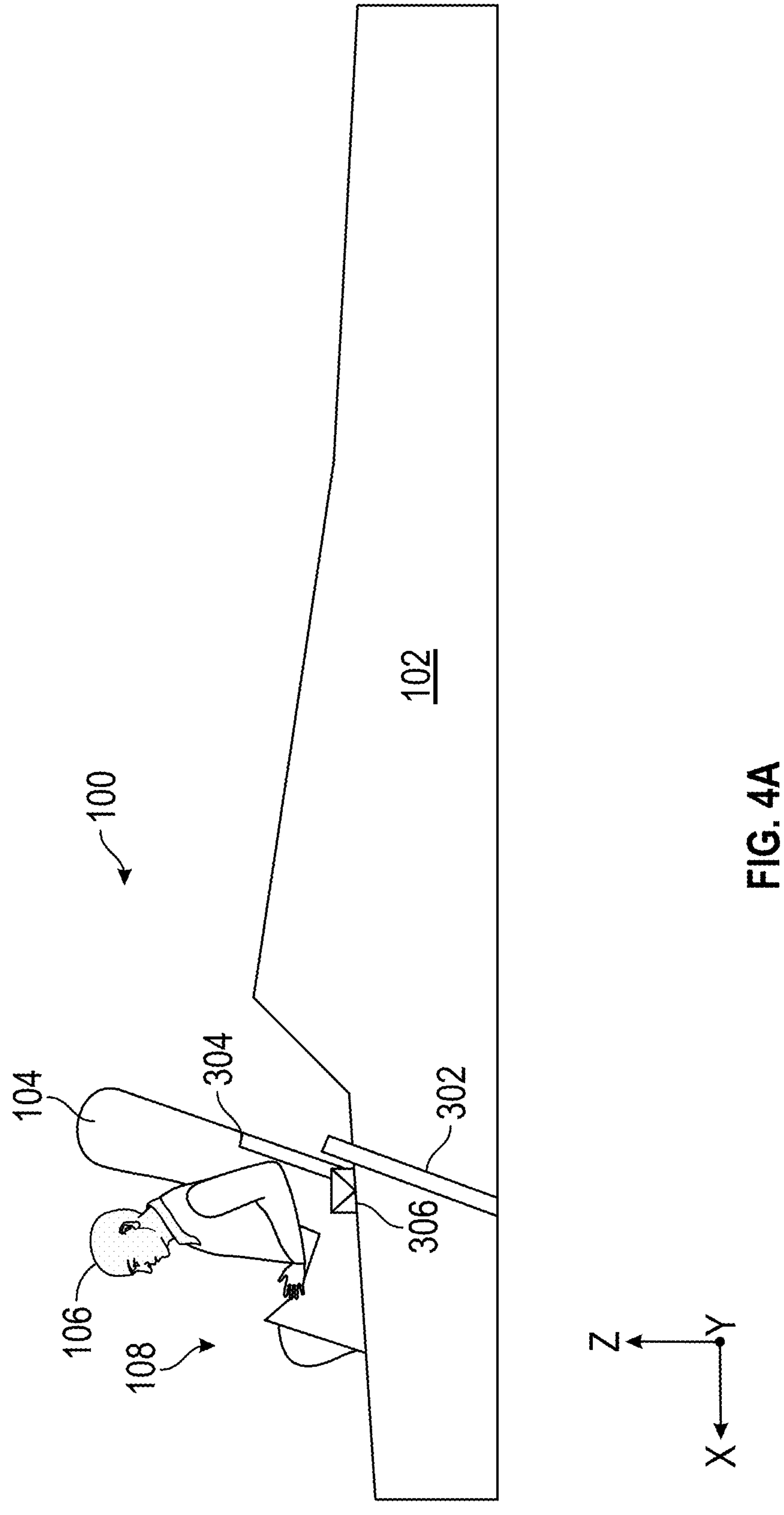
FIGS. 4A, 4B, and 4C illustrate various stages of an ejection system, in accordance with various embodiments.
Figure 4B:
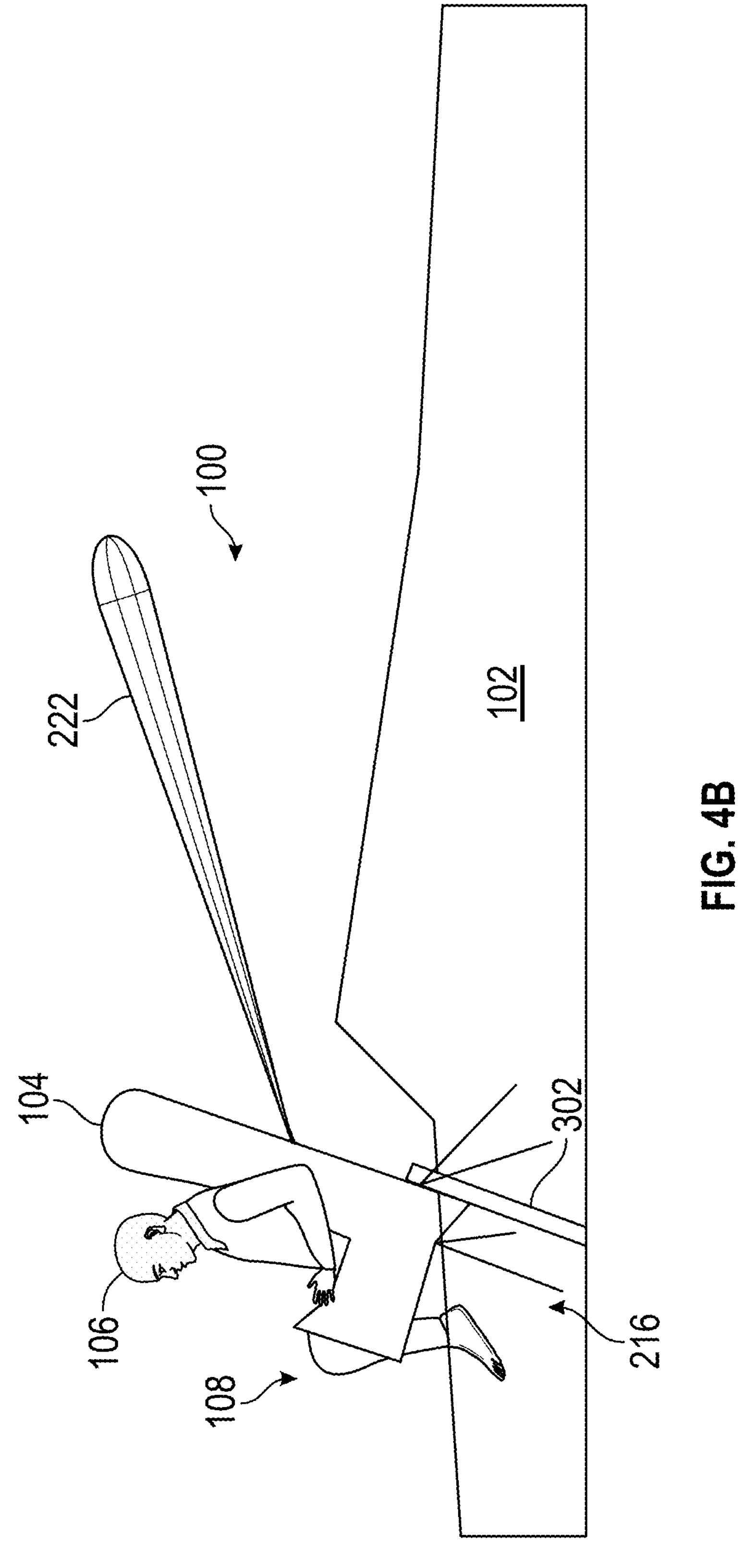
Figure 4C:
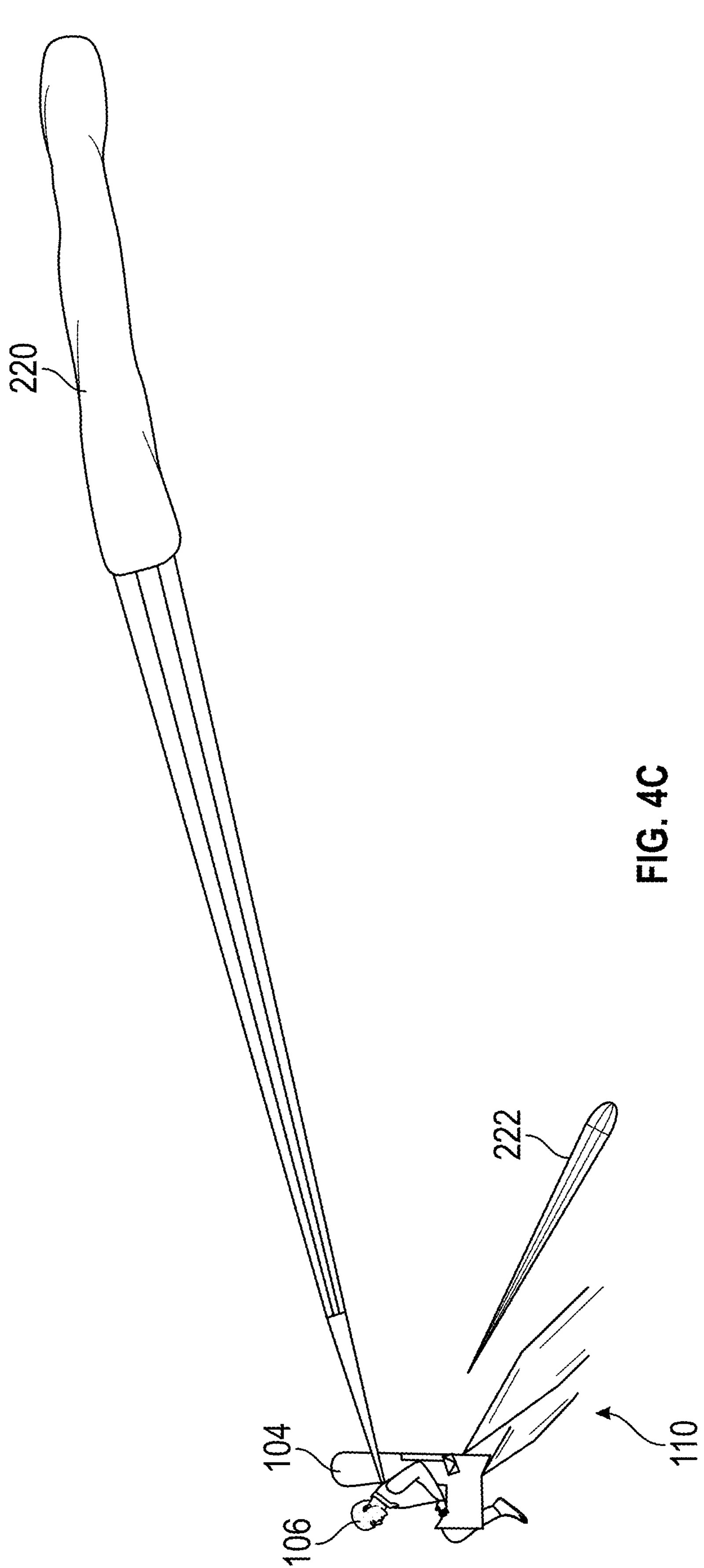

Referring now to FIGS. 4A-4C, stages of aircraft ejection system 100 are shown, in accordance with various embodiments. FIG. 4A illustrates a first stage of ejection system 100, including activation of a catapult propulsion system (e.g., catapult 217 of FIG. 2A) following an initial release of a canopy or other cockpit enclosure. FIG. 4B illustrates a second stage of ejection system 100, during or following the catapult phase, following start switch 306 activation, where drogue parachute 222 (e.g.; drogue 222 of FIG. 2A) has been deployed. FIG. 4C illustrates a third stage of ejection system 100, including activation of a sustained propulsion system 110 (e.g. propulsion system 110 of FIG. 1, divergence system 318 and/or stabilization system 320 of FIG. 3, or combinations thereof). Each stage of ejection system 100 may be initiated by controller 218 according to ejection sequence 254 to ensure proper execution of the ejection events, or, in various embodiments, may be otherwise activated by aircraft 102 prior to or just after controller 218 powering on. The ejection sequence 254 can involve sequentially performing a sequence of events listed, for example, in Tables 1 and 4 below. The events include, but are not limited to, drogue gun firing 312, initiating a stabilization system 320, initiating a divergence system 318, main parachute gun firing 314, initiating primary seat-drogue separator 310*a*, initiating secondary seat-drogue separator 310*b*, and initiating seat-aircrew separator 316.

Aircraft ejection system 100 further includes cockpit rails 302, seat rollers/sliders 304, and a start switch 306 (i.e.; event start signal). During an ejection event, ejection seat 104 travels away from cockpit 108 (e.g., in the positive z-direction) along cockpit rails 302 and seat rollers/sliders 304 which direct ejection seat 104 safely out of cockpit 108 and away from aircraft 102. Drogue parachute 222 and/or main parachute 220 may be deployed prior to, after, or during ejection seat 104 exit from cockpit 108. Start switch 306 provides a signal indicating that ejection seat is leaving cockpit 108 and may be any detection mechanism known in the art to provide an electrical signal such as a position switch, a proximity sensor, or the like. It is understood that aircraft 102 may be in any orientation relative to earth during an ejection, that ejection seat 104 may travel at various vectors along rails 102 away from cockpit 108, and that factors such as the orientation of gravitational acceleration and/or aerodynamic loading relative to ejection system 100 must be accounted for in the calibration and/or optimization of the ejection system 100.

Referring first to FIG. 4A, the first stage of ejection sequence is illustrated. The first stage of ejection sequence begins when controller 218 powers on (e.g., time t1) and ends when start switch 306 is actuated (e.g., time t0). Controller 218 is connected to start switch 306 and receives a signal when actuated. In various embodiments, start switch 306 may include multiple switches for redundancy. Controller 218 begins recording acceleration data from accelerometer at regular time intervals beginning at time t1. In various embodiments, and for ease of discussion, the regular time interval may be about 1 ms to about 4 ms. As noted above, any time interval may be used and the time interval may vary for each aircraft (e.g., aircraft 102).

Referring to ejection seat 104 and occupant 106 being propelled away from cockpit 108, the change in velocity ($\Delta$v) correlates to propulsion system thrust T(t) (e.g., catapult propellant thrust), ejected mass m(t) (e.g., the combined mass of ejection seat 104 and occupant 106), acceleration a(t), and the elapsed time period ($\Delta$t). During the first stage of the ejection sequence, controller 218 may continuously calculate a change in velocity of ejection seat 104 and occupant 106 based on the received acceleration data. In various embodiments, the continuous calculation may be made over a predefined period of time. In various embodiments, the calculation time period is about 20 ms to about 100 ms, and more specifically about 40 ms to about 60 ms. In various embodiments, the calculation time period may be about 44 ms. For ease of discussion below, the time period of 44 ms will be used.

The change in velocity may be determined by integrating the acceleration data received from accelerometer 244 over the calculation time period. This calculation may be performed at each regular time interval (e.g., $\Delta$t=4 ms). In practice, controller 218 may perform a piecewise summation of the product of accelerometer readings and the reading frequency time interval (i.e.; addition of discrete changes in velocity over an elapsed period) to determine an approximate total change in velocity. The equations used to determine the change in velocity in various embodiments are reproduced below:

$$\Delta v = \int_{t_1}^{t_0} \frac{|T(t)|}{m(t)}\,dt = \int_{t_1}^{t_0} a(t)dt = \lim_{\Delta t \to 0} \sum_{i=t_1}^{t_0} a(i)\Delta t$$

Controller 218 maintains a current calculated change in velocity. That is, controller 218 performs the computations described each time that controller 218 receives acceleration data. This allows controller 218 to use the calculated change in velocity over an elapsed time period as soon as start switch 306 is actuated. The first stage ends when start switch 306 is actuated (e.g., time $t_0$) at which time controller 218 has calculated the change in velocity from time $t_0$ backward to time $t_1$ over the calculation time period (e.g., 44 ms).

Referring next to FIG. 4B, the second stage of ejection sequence is illustrated. The second stage of ejection sequence begins when switch 306 is actuated (e.g., time $t_0$) and ends when controller 218 has determined an updated ejection sequence (e.g., ejection sequence 254) based on the change in velocity. Controller 218 retrieves the calculated change in velocity and may determine an approximate size of occupant 106 (e.g., small, medium, or large) based on the change in velocity. Controller 218 may then calculate a unitless mass scalar based on the change in velocity.

In various embodiments, the mass scalar ($S_m$) is calculated as a sliding ratio of the calculated change in velocity ($\Delta$v) to a nominal, predefined change in velocity ($\Delta v_n$), as shown in the equation below:

$$S_m = \frac{\Delta v}{\Delta v_n}$$

The nominal change in velocity ($\Delta v_n$) may be based on calibration data for the given system (e.g., aircraft ejection system 100 including ejection seat 104, occupant 106, and aircraft 102) using an average, or mean, ejection mass (e.g., ejection seat 104, occupant 106, and any typical ejection or aircrew mounted equipment). In various embodiments, the nominal change in velocity ($\Delta v_n$) may be calibrated to account for other factors such as catapult tolerances, temperatures, aircraft speed range, ejection orientation range, rail angles, etc.

The mass scalar ($S_m$) may then be applied to proportionally scale ejection sequence timing throughout the ejection event. In various embodiments, failsafe thresholds, such as an upper threshold and a lower threshold, may be identified for safety of occupant 106. In various embodiments, the failsafe value may be $S_m$=1 in the event that $S_m$ is substantially greater than the upper threshold ($S_{max}$), substantially less than the lower threshold ($S_{min}$), or otherwise cannot be calculated and/or is determined to be invalid. In various embodiments, the upper threshold ($S_{max}$) may be about 1.1 to about 1.3 (e.g., for a light sized occupant 106 weighing less than the medium sized occupant 106). In various embodiments, the lower threshold ($S_{min}$) may be about 0.7 to about 0.9 (e.g., for a heavy sized occupant 106 weighing more than the medium sized occupant 106).

In a non-limiting embodiment, such as in the case of multiple redundant processors relaying and voting on values, additional scalar values can be determined such as, for example, scalar_local ($S_{LOCAL}$), scalar_left ($S_{LEFT}$), and scalar_right ($S_{RIGHT}$), where a local value is calculated on the local processor and left and right relay values are calculated on adjacent/redundant processors and thereafter relayed between processors. Accordingly, a scalar value median ($S_{MED}$) can be determined by taking the median of scalar_local ($S_{LOCAL}$), scalar_left ($S_{LEFT}$), and scalar_right ($S_{RIGHT}$), thereby ruling out extreme or erroneous values. The scalar value median can be defined as: $S_{MED}$=Median [$S_{LOCAL}$,$S_{LEFT}$,$S_{RIGHT}$].

According to a non-limiting embodiment, the controller 218 can compare $S_m$ to the upper threshold ($S_{max}$) and the lower threshold ($S_{min}$), and can adjust the ejection sequence based on the threshold comparison and a current ejection mode selection described herein (e.g., MODE 1, MODE 2A, MODE 2B, MODE 3A, MODE 3B) by using $S_m$ as a divisor, as a multiplier, as a non-linear scalar, or as a quadratic scalar, among others. If, for example, $S_m>S_{max}$, then the controller 218 can set $S_m=S_{max}$, and adjust the ejection sequence using the $S_m$ value corresponding to the current ejection mode selection (e.g., as a divisor, as a multiplier, as a non-linear scalar, or as a quadratic scalar, among others). If $S_m<S_{min}$, than the controller 218 can set $S_m=S_{min}$, and adjust the ejection sequence using the $S_m$ value corresponding to the current ejection mode selection (e.g., as a divisor, as a multiplier, as a non-linear scalar, or as a quadratic scalar, among others). In various embodiments, the value used by the controller may be set to $S_m=S_{MED}$ in the event multiple values are available from multiple processors.

Figure 5:
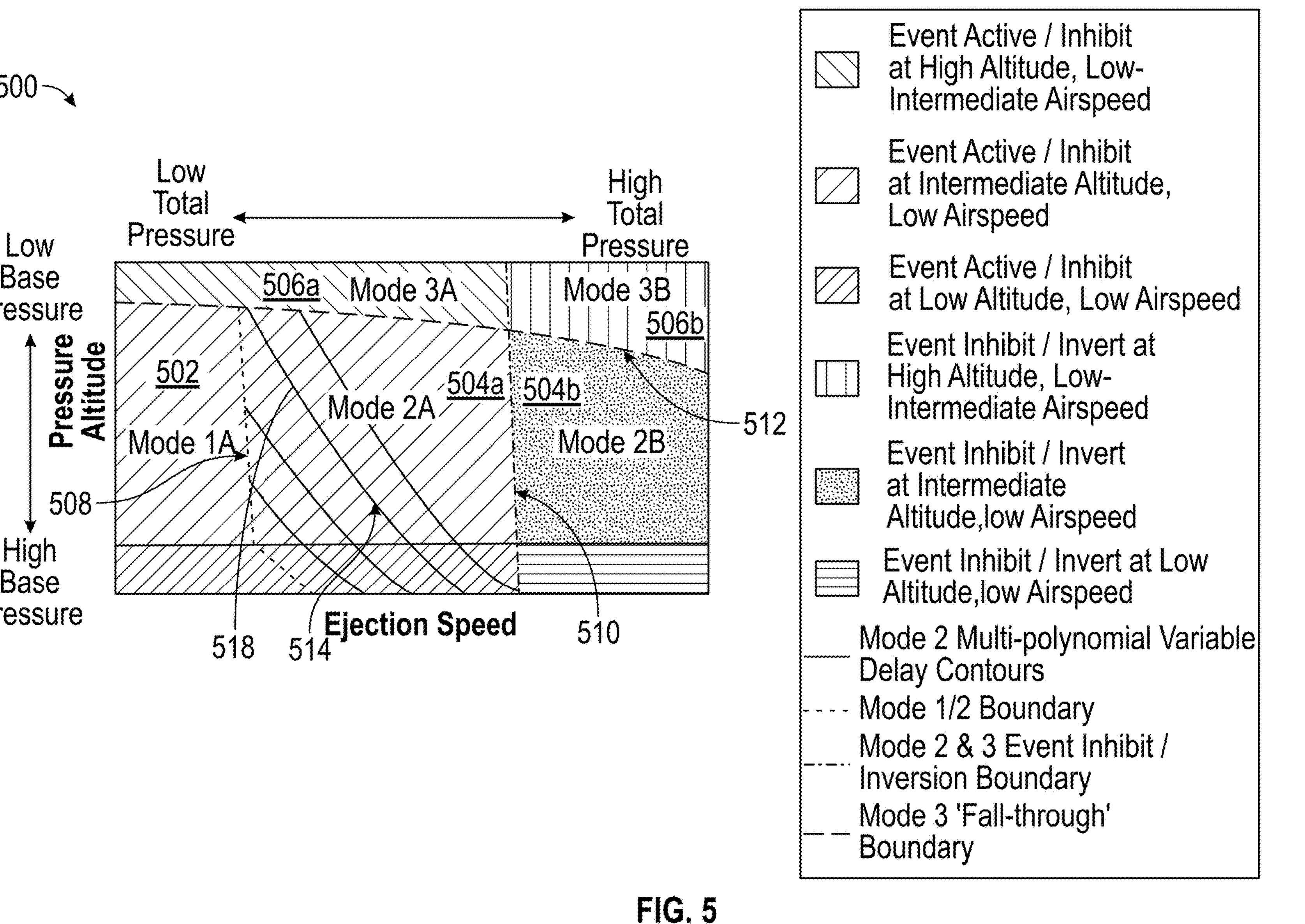
FIG. 5 illustrates a chart of altitude versus aircraft speed for various ejection sequence modes, in accordance with various embodiments.

Turning now to FIG. 5, a chart 500 of altitude (left vertical axis) versus aircraft speed (horizontal axis) for various ejection sequence modes is illustrated according to a non-limiting embodiment of the present disclosure. The chart 500 is depicts various ejection sequence regions (i.e., "MODES) including: MODE 1 502; MODE 2A 504*a*; MODE 2B 504*b*; MODE 3A 506*a*; MODE 3B 506*b*. A MODE 1-2 boundary 508 separates MODE 1 502 from MODE 2A 504*a*. According to an embodiment, the selection of MODE 1 502 and MODE 2A 504*a*/MODE 2B 504*b* is based on the delta pressure (pressure difference) between the pitot pressure and the base pressure. A MODE 2-3 boundary 510 separates MODE 2A 504*a* and MODE 2B 504*b*, and also separates MODE 3A 506*a* and MODE 3B 506*b*. A MODE 3 boundary 512 (referred to herein as a "fall-through boundary" separates MODE 3A 506*a* and MODE 3B 506*b* from MODE 1 502, MODE 2A 504*a*, and MODE 2B 504*b*. According to an embodiment, MODE 3 is selected at base pressures below about 8.2 psia.

Further illustrated are various MODE 2 (e.g., MODE 2A and/or MODE 2B) multi-polynomial variable time delay contours 514 (each contour line representing a delay increment). Each MODE 2 multi-polynomial variable time delay contour 514 includes a low portion 516 indicating use of a lower altitude time delay contour polynomial formula when executing the ejection seat event sequence and a high portion 518 indicating use of a high altitude time delay contour polynomial formula when executing the ejection seat event sequence, thereby providing for balance between terrain clearance optimization with relationship to lower altitudes at time of ejection and lower velocity at time of main parachute inflation with relationship to higher altitudes at time of ejection.

In various non-limiting embodiments, the polynomial formulas, event time delay formulas, scalar formulas, variables, constants, typical units, and fundamental logic used by control system 300 when invoking a target MODE of operation and event execution as described herein are shown in summary with respect to the tables as follows. Key summary information and typical units are shown as examples; it is understood that additional variables, constants, formulas, logical statements/arguments (i.e.; deterministic, non-probabilistic logic), systems of units (e.g.; metric), and so on may be used in the computation of intermediate and/or final values used by control system 300.

In a non-limiting embodiment, Tables 1-3 describe multi-polynomial variable modes with variable event timing sequence and event inhibit/inversion (see FIG. 5 for graphical depiction) executed by an ejection control system 300 (see FIG. 3). Table 1 lists the multi-polynomial variable modes. Table 2 lists descriptions of the variable codes and constant codes. Table 3 lists additional notes associated with the variable modes and logic.

TABLE 1

| | | Event Timing Formulas by Mode (units in Seconds) | | | | |
|---|---|---|---|---|---|---|
| Event | Ejection Seat Subsystem Initiated | MODE 1 502 (See Notes 2 & 3) | MODE 2A 504a (See Notes 2, 3, & 6) | MODE 2B 504b (See Notes 2, 3, 5, & 6) | MODE 3A 506a (See Notes 2 & 3) | MODE 3B 506b (See Notes 2, 3, 5 & 6) |
| 1 | Drogue Gun 312 (see Note 4) | Make Inoperative | =T0 + T1a | =T0 + T1b | =T0 + T1a | =T0 + T1b |
| 2 | Stabilization System 320 | =T0 + T2a | =T0 + T2a | =T0 + T2b | =T0 + T2a | =T0 + T2b |
| 3 | Divergence System 318 (see Note 5) | =T0 + T3 | =T0 + T3 | Make Inoperative | =T0 + T3 | Make Inoperative |
| 4 | Main Parachute Gun 314 | =T0 + T4 | =T0 + T1a + D | =T0 + T1b + D | =T0f + T1a + DMAX | =T0f + T1b + DMAX |
| 5 | Seat-Drogue Separator 310a (Primary) | =T0 + T4 + T5 | =T0 + T1a + D + T5 | =T0 + T1b + D + T5 | =T0f + T1a + DMAX + T5 | =T0f + T1b + DMAX + T5 |
| 6 | Seat-Drogue Separator 310b (Secondary) | =T0 + T4 + T6 | =T0 + T1a + D + T6 | =T0 + T1b + D + T6 | =T0f + T1a + DMAX + T6 | =T0f + T1b + DMAX + T6 |
| 7 | Seat-Aircrew Separator 316 | =T0 + T4 + T7 | =T0 + T1a + D + T7 | =T0 + T1b + D + T7 | =T0f + T1a + DMAX + T7 | =T0f + T1b + DMAX + T7 |

TABLE 2

| Description (Variables in Code or Constants in Lookup) | Example Designator | Value | Units |
|---|---|---|---|
| All Mode Start Switch Time Zero (T0) | SSWT | Variable | Second |
| Mode 3 Fall Through Time (T0f) | M3FTT | Variable | Second |
| Mode 2 Dynamic Delay Local | DDEL | Variable | Second |
| Mode 2 Dynamic Delay A (Da) | DDELA | Variable | Second |
| Mode 2 Dynamic Delay B (Db) | DDELB | Variable | Second |
| Mode 2 Parachute Delay Value Median (D) | DMED | Variable | Second |
| Current Minimum Base Pressure | CMBP | Variable | Second |
| Current Maximum Pitot Pressure | CMPP | Variable | Second |
| Mode 3 Fall Through Pressure | M3FTP | Constant | PSI |
| Mode 1 & 2 Boundary Slope (m1) | SLOP1 | Constant | (PSI/PSI) |
| Mode 1 & 2 Boundary Intercept (b1) | INCP1 | Constant | PSI |
| Mode 2 & 3 Dvgc Inhibit Slope (m2) | SLOP2 | Constant | (PSI/PSI) |
| Mode 2 & 3 Dvgc Inhibit Intercept (b2) | INCP2 | Constant | PSI |
| Mode 2a & 3a Drogue Gun Delay (T1a) | TIME1A | Constant | Second |
| Mode 2b & 3b Drogue Gun Delay (T1b) | TIME1B | Constant | Second |
| Mode 1, 2a, 3a Stabilization Delay (T2a) | TIME2A | Constant | Second |
| Mode 2b, 3b Stabilization Delay (T2b) | TIME2B | Constant | Second |
| Divergence System Delay (T3) | TIME3 | Constant | Second |
| Mode 1 Parachute Gun Delay (T4) | TIME4 | Constant | Second |
| Seat-Drogue Separator Primary Delay (T5) | TIME5 | Constant | Second |
| Seat-Drogue Separator Secondary Delay (T6) | TIME6 | Constant | Second |
| Seat-Aircrew Separator Delay (T7) | TIME7 | Constant | Second |
| Coefficient (A1) | COA1 | Constant | Second |
| Coefficient (A2) | COA2 | Constant | Second/PSI |
| Coefficient (A3) | COA3 | Constant | Second/PSI |
| Coefficient (A4) | COA4 | Constant | Second |
| Coefficient (B1) | COB1 | Constant | Second |
| Coefficient (B2) | COB2 | Constant | Second/PSI |
| Coefficient (B3) | COB3 | Constant | Second/PSI |
| Coefficient (B4) | COB4 | Constant | Second |
| Delay Maximum | DMAX | Constant | Second |
| Delay Minimum | DMIN | Constant | Second |

TABLE 3

| | |
|---|---|
| 1 | Start Switch detection and mode determination establishes “T0” as the delta timing reference point for all events in Modes 1 and 2, and items 1-3 in Mode 3.<br>Base pressure crossover establishes “T0f” for Mode 3, timing formulas shown for events 4-7 in Mode 3 are to establish default minimums. |
| 2 | Selection of Modes 1 vs. 2A vs 2B is based on the delta pressure between the pitot and base pressures sensed. Mode 3 is always selected at base pressures below fall-through pressure. |
| 3 | Circuit firing characteristics and event time tolerances apply across the full pressure and temperature range for each subsystem. |
| 4 | Drogue gun is inhibited in Mode 1 as indicated by “Make Inoperative”. |
| 5 | Divergence system is inhibited in Modes 2b and 3b as indicated by “Make Inoperative”. |
| 6 (logic) | “D” denotes the timing delay DMED calculated from the Base and Pitot Pressure as follows:<br>DDELA = A1 + A2*(CMBP) + A3*(CMPP) + A4*((CMBP)/(CMPP))^2<br>DDELB = B1 + B2*(CMBP) + B3*(CMPP) + B4*((CMBP)/(CMPP))^2<br>DDEL = Minimum [DDELA, DDELB]<br>If DDEL > DMAX, then set DDEL = DMAX<br>If DDEL < DMIN, then set DDEL = DMIN and default to Mode 1 selection locally<br>DDEL is relayed to the other MCUs regardless of mode selection<br>DMED = Median [$DDEL_{Local}$, $DDEL_{Left}$, $DDEL_{Right}$] |

In an alternate non-limiting embodiment, Tables 4-6 describe multi-polynomial variable modes with variable event timing sequence and event inhibit/inversion and instances of further event timing sequence scaling using a mass scalar based on change in velocity (see FIG. 5 for graphical depiction) executed by an ejection control system 300 (see FIG. 3). Table 4 lists the multi-polynomial variable modes. Table 5 lists descriptions of the variable codes and constant codes. Table 6 lists additional notes associated with the variable modes and logic.

TABLE 4

| | | Event Timing Formulas by Mode (units in Seconds) | | | | |
|---|---|---|---|---|---|---|
| Event | Ejection Seat Subsystem Initiated | MODE 1 502 (See Notes 2 & 3) | MODE 2A 504a (See Notes 2, 3, & 6) | MODE 2B 504b (See Notes 2, 3, 5, & 6) | MODE 3A 506a (See Notes 2 & 3) | MODE 3B 506b (See Notes 2, 3, 5 & 6) |
| 1 | Drogue Gun 312 (see Note 4) | Make Inoperative | =T0 + T1a | =T0 + (T1b/$S^3$) | =T0 + T1a | =T0 + (T1b/$S^3$) |
| 2 | Stabilization System 320 | =T0 + T2a | =T0 + T2a | =T0 + T2b | =T0 + T2a | =T0 + T2b |
| 3 | Divergence System 318 (see Note 5) | =T0 + T3 | =T0 + T3 | Make Inoperative | =T0 + T3 | Make Inoperative |
| 4 | Main Parachute Gun 314 | =T0 + (T4*$S^2$) | =T0 + T1a + (D*S) | =T0 + T1b + (D*S) | =T0f + T1a + DMAX | =T0f + T1b + DMAX |
| 5 | Seat-Drogue Separator 310a (Primary) | =T0 + T4 + T5 | =T0 + T1a + (D*S) + T5 | =T0 + T1b + (D*S) + T5 | =T0f + T1a + DMAX + T5 | =T0f + T1b + DMAX + T5 |
| 6 | Seat-Drogue Separator 310b (Secondary) | =T0 + T4 + T6 | =T0 + T1a + (D*S) + T6 | =T0 + T1b + (D*S) + T6 | =T0f + T1a + DMAX + T6 | =T0f + T1b + DMAX + T6 |
| 7 | Seat-Aircrew Separator 316 | =T0 + T4 + T7 | =T0 + T1a + (D*S) + T7 | =T0 + T1b + (D*S) + T7 | =T0f + T1a + DMAX + T7 | =T0f + T1b + DMAX + T7 |

TABLE 5

| Description (Variables in Code or Constants in Lookup) | Example Designator | Value | Units |
|---|---|---|---|
| All Mode Start Switch Time Zero ($T_0$) | SSWT | Variable | Second |
| Mode 3 Fall Through Time ($T_{0f}$) | M3FTT | Variable | Second |
| Mode 2 Dynamic Delay Local | DDEL | Variable | Second |
| Mode 2 Dynamic Delay A ($D_a$) | DDELA | Variable | Second |
| Mode 2 Dynamic Delay B ($D_b$) | DDELB | Variable | Second |
| Mode 2 Delay Value Median (D) | DMED | Variable | Second |
| Change in Velocity ($\Delta v$) | DELV | Variable | Ft/Second |
| Mass Scalar ($S_m$) | SCAL | Variable | (unitless) |
| Scalar Value Median (S) | SMED | Variable | (unitless) |
| Current Minimum Base Pressure | CMBP | Variable | Second |
| Current Maximum Pitot Pressure | CMPP | Variable | Second |
| Mode 3 Fall Through Pressure | M3FTP | Constant | PSI |
| Mode 1 & 2 Boundary Slope (m1) | SLOP1 | Constant | (PSI/PSI) |
| Mode 1 & 2 Boundary Intercept (b1) | INCP1 | Constant | PSI |
| Mode 2 & 3 Dvgc Inhibit Slope (m2) | SLOP2 | Constant | (PSI/PSI) |
| Mode 2 & 3 Dvgc Inhibit Intercept (b2) | INCP2 | Constant | PSI |
| Mode 2a & 3a Drogue Gun Delay (T1a) | TIME1A | Constant | Second |
| Mode 2b & 3b Drogue Gun Delay (T1b) | TIME1B | Constant | Second |
| Mode 1, 2a, 3a Stabilization Delay (T2a) | TIME2A | Constant | Second |
| Mode 2b, 3b Stabilization Delay (T2b) | TIME2B | Constant | Second |
| Divergence System Delay (T3) | TIME3 | Constant | Second |
| Mode 1 Parachute Gun Delay (T4) | TIME4 | Constant | Second |

TABLE 5-continued

| Description (Variables in Code or Constants in Lookup) | Example Designator | Value | Units |
|---|---|---|---|
| Seat-Drogue Separator Primary Delay (T5) | TIME5 | Constant | Second |
| Seat-Drogue Separator Secondary Delay (T6) | TIME6 | Constant | Second |
| Seat-Aircrew Separator Delay (T7) | TIME7 | Constant | Second |
| Coefficient (A1) | COA1 | Constant | Second |
| Coefficient (A2) | COA2 | Constant | Second/PSI |
| Coefficient (A3) | COA3 | Constant | Second/PSI |
| Coefficient (A4) | COA4 | Constant | Second |
| Coefficient (B1) | COB1 | Constant | Second |
| Coefficient (B2) | COB2 | Constant | Second/PSI |
| Coefficient (B3) | COB3 | Constant | Second/PSI |
| Coefficient (B4) | COB4 | Constant | Second |
| Delay Maximum | DMAX | Constant | Second |
| Delay Minimum | DMIN | Constant | Second |
| Delta Velocity Nominal ($\Delta v_n$) | DELVN | Constant | Ft/Second |
| Scalar Time (T) | TSCAL | Constant | Second |
| Scalar Maximum | SMAX | Constant | (unitless) |
| Scalar Minimum | SMIN | Constant | (unitless) |

TABLE 6

| | | |
|---|---|---|
| 1 | Start Switch detection and mode determination establishes "T0" as the delta timing reference point for all events in Modes 1 and 2, and items 1-3 in Mode 3. Base pressure crossover establishes "T0f" for Mode 3, timing formulas shown for events 4-7 in Mode 3 are to establish default minimums. | |
| 2 | Selection of Modes 1 vs. 2A vs 2B is based on the delta pressure between the pitot and base pressures sensed. Mode 3 is always selected at base pressures below fall-through pressure. | |
| 3 | Circuit firing characteristics and event time tolerances apply across the full pressure and temperature range for each subsystem. | |
| 4 | Drogue gun is inhibited in Mode 1 as indicated by "Make Inoperative". | |
| 5 | Divergence system is inhibited in Modes 2B and 3B as indicated by "Make Inoperative". | |
| 6 (logic) | "D" denotes the timing Delay DMED calculated from the Base and Pitot Pressure via the formulas: | "S" denotes the Scalar SMED calculated from the accelerations via the formulas: |
| | DDELA = A1 + A2*(CMBP) + A3*(CMPP) + A4*((CMBP)/(CMPP))^2 | $DELV = \lim_{\Delta t \to 0} \sum_{i=T_1}^{T_0} a(i)\Delta t$ |
| | DDELB = B1 + B2*(CMBP) + B3*(CMPP) + B4*((CMBP)/(CMPP))^2 | where $T_1$ is a fixed time prior to $T_0$, $\Delta t$ is the timestep, and a(t) is acceleration vs time |
| | DDEL = Minimum [DDELA, DDELB] | SCAL = DELV/DELVN |
| | If DDEL > DMAX, then set DDEL = DMAX | If SCAL > SMAX, then set SCAL = SMAX |
| | If DDEL < DMIN, then set DDEL = DMIN and default to Mode 1 selection locally | If SCAL < SMIN, then set SCAL = SMIN |
| | DDEL is relayed to the other MCUs regardless of mode selection | SCAL is relayed to the other MCUs regardless of mode selection |
| | DMED = Median [$DDEL_{Local}$, $DDEL_{Left}$, $DDEL_{Right}$] | SMED = Median [$SCAL_{Local}$, $SCAL_{Left}$, $SCAL_{Right}$] |

Figure 6:
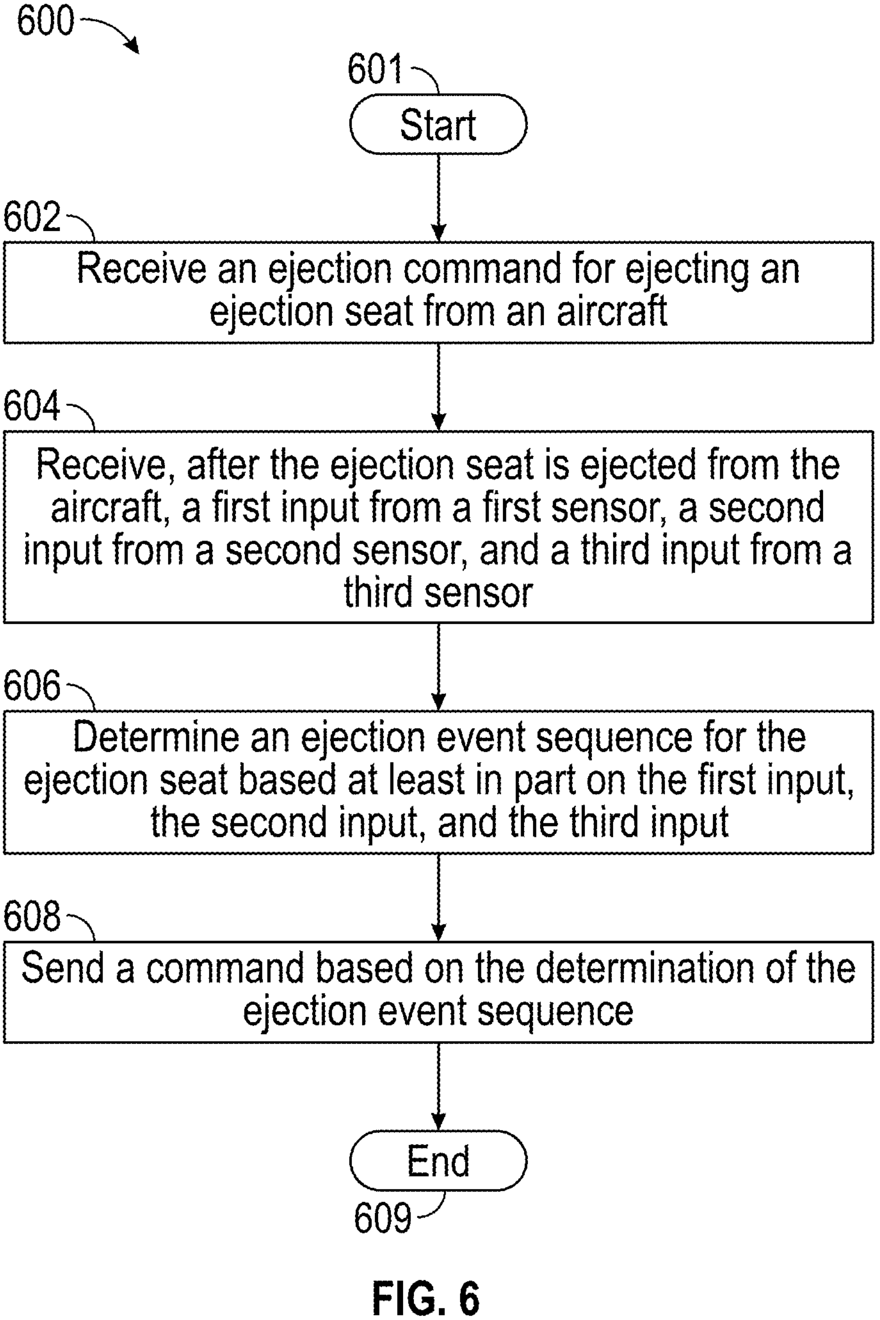
FIG. 6 is a flow diagram illustrating an overall event sequencing of an ejection event sequence according to a non-limiting embodiment of the present disclosure.

Referring to FIG. 6, a flow diagram 600 illustrating an overall event sequencing of an ejection event sequence according to a non-limiting embodiment of the present disclosure. The method begins at operation 601, and an ejection command for ejecting an ejection seat from an aircraft is received at operation 602. After the ejection seat is ejected from the aircraft, a first input is received from a first sensor, a second input is received from a second sensor, and a third input is received from a third sensor. At operation 606, an ejection event sequence is determined for the ejection seat based at least in part on the first input, the second input, and the third input. At operation 608, a command is sent based on the determination of the ejection event sequence, and the method ends at operation 609.

Figure 7:
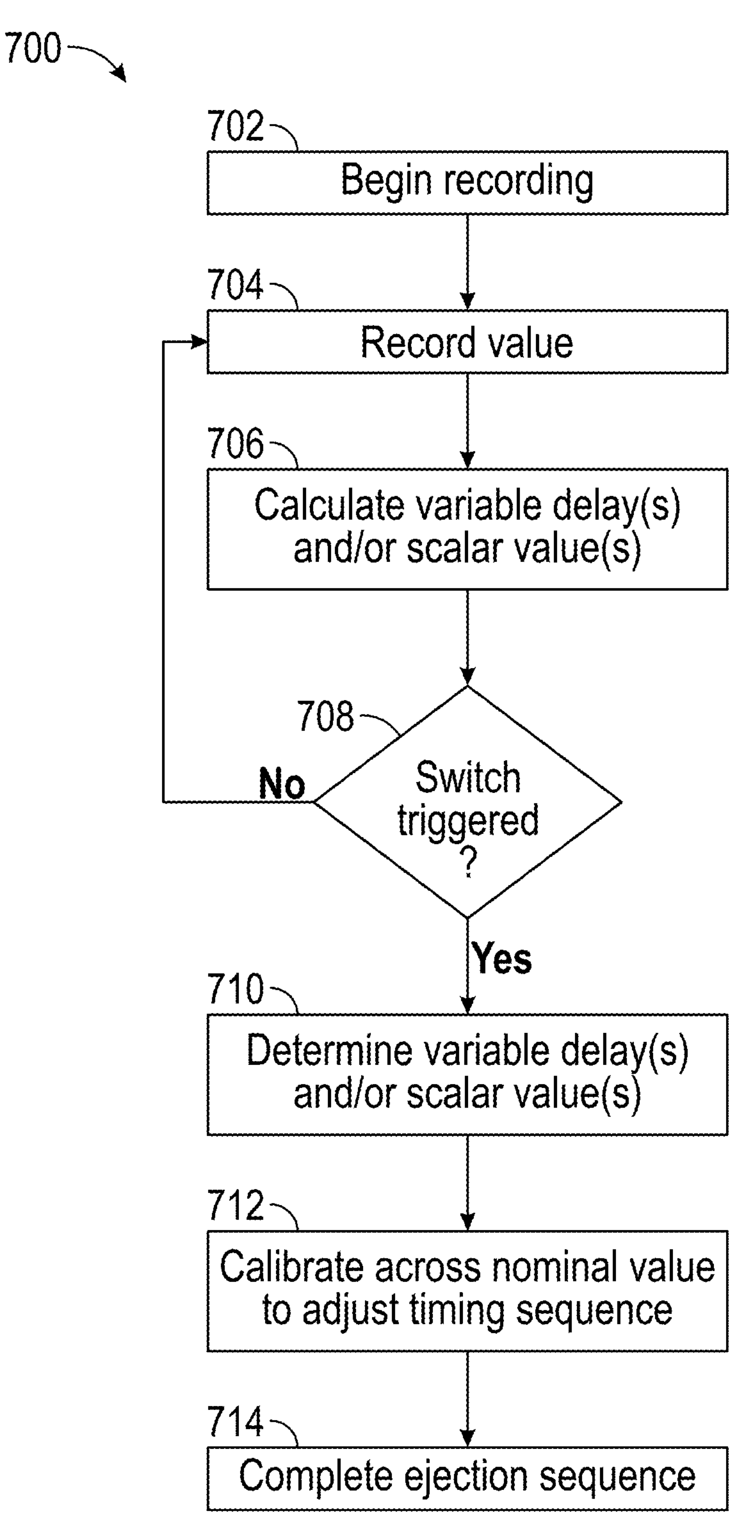
FIG. 7 is a flow diagram illustrating a variable delay/scalar algorithm for performing an ejection sequence is illustrated according to a non-limiting embodiment of the present disclosure.

Turning now to FIG. 7, a flow diagram 700 illustrating a variable delay/scalar algorithm for performing an ejection sequence is illustrated according to a non-limiting embodiment of the present disclosure. Recording begins at operation 702 and one or more values are recorded (e.g., using controller 218) at operation 704. According to an embodiment, the values include acceleration data received from accelerometer 244, pressure altitude and/or equivalent airspeed (i.e., measured as base pressure at sensor 240, total pressure at sensors 232 and 234, and/or dynamic pressure), and occupant size (e.g.; measured as a change in acceleration, velocity, or time of the ejected system over a distance as compared to a nominal value). In various embodiments, controller 218 may wait a predefined time period to receive and record the acceleration data. In various embodiments, the predetermined time period may be about 0.5 ms to about 20 ms, and more specifically, about 2 ms to about 10 ms.

At operation 706, one or more variable delays and/or one or more scalar values (e.g., constants) are calculated. The variable delays and scalar values are listed, for example, in Tables 1-3 and 4-6 described herein. At operation 708, a determination is made as to whether a switch (e.g., start switch 306) is triggered. When the switch is not triggered, the method 700 returns to operation 704 and continues recording values. When, however, the switch is triggered, one or more variable delays and/or one or more scalar values are determined at operation 710. According to a non-limiting embodiment, the variable delays and/or one or more scalar values are determined based, at least in part, the size of an occupant 106 (e.g. change in velocity over a distance), equivalent airspeed, equivalent altitude, and/or pressures (e.g., base pressure, total pressure, and/or dynamic pressure). At operation 712, a calibration across nominal values to adjust the timing sequence is performed, and the ejection sequence is completed at operation 714 (e.g.; the events of control system 300).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A control system configured to control ejection of an ejection seat, the control system comprising:

a sensor configured to measure ejection environment parameters at time of ejection from an aircraft;

a controller in signal communication with the sensor to receive the ejection environment parameters and to store an ejection sequence operable according to a plurality of different ejection sequence modes, the controller configured to determine a weight of an occupant seated in the ejection seat and a target ejection sequence mode among the plurality of different ejection sequence modes based on the ejection environment parameters and the weight of the occupant, and to execute the ejection sequence according to the target ejection sequence mode to eject the ejection seat and safely recover the occupant, wherein the plurality of different ejection sequence modes include a first ejection sequence mode, a second ejection sequence mode, and a third ejection sequence mode, and wherein the second ejection sequence mode includes a first plurality of sub-modes, and the second ejection sequence mode includes a second plurality of sub-modes different from the first plurality of sub-modes.

2. The control system of claim 1, wherein the ejection sequence includes a plurality of different ejection events executed according to individual timing sequences, and wherein the ejection environment parameters include measured pressure(s), measured airspeed, and/or measured altitude at time of ejection.

3. The control system of claim 1, wherein:

the first ejection sequence mode corresponds to a first airspeed range and a first altitude range, which ranges from a first altitude to a second altitude greater than the first altitude;

a first sub-mode of the second ejection sequence mode corresponds to a second airspeed range greater than the first airspeed range and a second altitude range equal to the first altitude range;

a second sub-mode of the second ejection sequence mode corresponds to a third airspeed range greater than the second airspeed range and a third altitude range equal to the first altitude range;

a first sub-mode of the third ejection sequence mode corresponds to an airspeed ranging from the first airspeed range to the second airspeed range and a third altitude range greater than the first and second altitude ranges; and a second sub-mode of the third ejection sequence mode corresponds to the third airspeed range greater than the first and second airspeed range and the third altitude range greater than the first and second altitude ranges.

4. The control system of claim 3, wherein the controller determines a plurality of scalar values and a plurality of variable values, and applies one or both of at least one selected scalar value included in the plurality of scalar values and at least one selected variable value included in the plurality of variable values to the timing sequences based on the target ejection sequence mode.

5. The control system of claim 3, wherein the controller applies at least one selected scalar value included in the plurality of scalar values to the timing sequence corresponding to the first mode, and applies both the at least one selected scalar value and at least one selected variable value included in the plurality of variable values to the first and second sub-modes of the second ejection sequence mode and the first and second sub-modes of the third ejection sequence mode.

6. The control system of claim 3, wherein the plurality of scalar values includes a mass scalar that is determined by the controller based on a change in velocity of the ejection system over a distance or period of time.

7. The control system of claim 3, wherein the plurality of scalar values includes a mass scalar that is determined by the controller based on the weight of the occupant.

8. A control system configured to control ejection of an ejection seat, the control system comprising:

a sensor configured to measure ejection environment parameters upon ejection from an aircraft, the parameters including an equivalent airspeed and equivalent altitude of an ejection system at time of ejection from the aircraft;

a controller in signal communication with the sensor to receive the ejection environment parameters and to store an ejection sequence operable according to a plurality of different ejection sequence modes, the controller configured to determine a target ejection sequence mode among the plurality of different ejection sequence modes based on the ejection environment parameters and to execute the ejection sequence according to the target ejection sequence mode to eject the ejection seat and safely recover an occupant, wherein the ejection sequence includes a plurality of different ejection events executed according to individual timing sequences, and wherein at least one of the timing sequences includes a variable delay tolerance that is dynamically calculated by the controller based on the equivalent airspeed output from the sensor, wherein the plurality of different ejection sequence modes include a first ejection sequence mode, a second ejection sequence mode, and a third ejection sequence mode, and wherein the second ejection sequence mode includes a first plurality of sub-modes, and the second ejection sequence mode includes a second plurality of sub-modes different from the first plurality of sub-modes.

9. The control system of claim 8, wherein:

the first ejection sequence mode corresponds to a first airspeed range and a first altitude range, which ranges from a first altitude to a second altitude greater than the first altitude;

a first sub-mode of the second ejection sequence mode corresponds to a second airspeed range greater than the first airspeed range and a second altitude range equal to the first altitude range;

a second sub-mode of the second ejection sequence mode corresponds to a third airspeed range greater than the second airspeed range and a third altitude range equal to the first altitude range;

a first sub-mode of the third ejection sequence mode corresponds to an airspeed ranging from the first airspeed range to the second airspeed range and a third altitude range greater than the first and second altitude ranges; and a second sub-mode of the third ejection sequence mode corresponds to the third airspeed range greater than the first and second airspeed range and the third altitude range greater than the first and second altitude ranges.

10. The control system of claim 9, wherein the controller determines a plurality of scalar values and a plurality of variable values, and applies one or both of at least one selected scalar value and at least one selected variable value to the timing sequences based on the target ejection sequence mode.

11. A method of controlling ejection of an ejection seat, the method comprising:

outputting measured ejection environment parameters from a sensor, the parameters including an equivalent airspeed and equivalent altitude of an ejection system at time of ejection from an aircraft;

storing, in a controller, an ejection sequence operable according to a plurality of different ejection sequence modes, the ejection sequence including a plurality of different ejection events executed according to individual timing sequences;

dynamically calculating, by the controller a variable delay tolerance based on the equivalent airspeed output from the sensor;

applying the variable delay tolerance to a timing sequence corresponding to at least one of the ejection events;

determining, by the controller, a target ejection sequence mode among the plurality of different ejection sequence modes based on the ejection environment parameters;

executing, by the controller, the ejection sequence according to the target ejection sequence mode to eject the ejection seat and safely recover an occupant, wherein the plurality of different ejection sequence modes include a first ejection sequence mode, a second ejection sequence mode, and a third ejection sequence mode, wherein the second ejection sequence mode includes a first plurality of sub-modes, and wherein the second ejection sequence mode includes a second plurality of sub-modes different from the first plurality of sub-modes.

12. The method of claim 11, wherein:

the first ejection sequence mode corresponds to a first airspeed range and a first altitude range, which ranges from a first altitude to a second altitude greater than the first altitude;

a first sub-mode of the second ejection sequence mode corresponds to a second airspeed range greater than the first airspeed range and a second altitude range equal to the first altitude range;

a second sub-mode of the second ejection sequence mode corresponds to a third airspeed range greater than the second airspeed range and a third altitude range equal to the first altitude range;

a first sub-mode of the third ejection sequence mode corresponds to an airspeed ranging from the first airspeed range to the second airspeed range and a third altitude range greater than the first and second altitude ranges; and a second sub-mode of the third ejection sequence mode corresponds to the third airspeed range greater than the first and second airspeed range and the third altitude range greater than the first and second altitude ranges.

13. The method of claim 12, wherein the controller determines a plurality of scalar values and applies at least one selected scalar value to the timing sequences based on the target ejection sequence mode.

14. The method of claim 13, wherein the plurality of scalar values includes a mass scalar that is determined by the controller based on a change in velocity of the ejection seat over a distance or period of time.

15. The method of claim 13, wherein the plurality of scalar values includes a mass scalar that is determined by the controller based on the weight of the occupant.

* * * * *